United States Patent
Baig

(10) Patent No.: US 8,964,711 B2
(45) Date of Patent: Feb. 24, 2015

(54) PRIVATE LINE AUTOMATIC RINGDOWN-LIKE CONNECTION FOR A MOBILE DEVICE

(75) Inventor: Naved Baig, Palatine, IL (US)

(73) Assignee: Symbol Technologies, Inc., Holtsville, NY (US)

( * ) Notice: Subject to any disclaimer, the term of this patent is extended or adjusted under 35 U.S.C. 154(b) by 279 days.

(21) Appl. No.: 13/547,207

(22) Filed: Jul. 12, 2012

(65) Prior Publication Data

US 2014/0016627 A1 Jan. 16, 2014

(51) Int. Cl.
*H04W 84/12* (2009.01)

(52) U.S. Cl.
USPC ......................................................... 370/338

(58) Field of Classification Search
CPC .. H04M 2250/06; H04M 1/7253; H04W 4/16
See application file for complete search history.

(56) References Cited

U.S. PATENT DOCUMENTS

| | | |
|---|---|---|
| 7,009,962 B1 | 3/2006 | Chung et al. |
| 7,991,150 B2 | 8/2011 | Basart et al. |
| 2009/0048845 A1 | 2/2009 | Burckart et al. |
| 2011/0234379 A1 | 9/2011 | Lee |
| 2011/0281580 A1 | 11/2011 | Tonogal et al. |
| 2013/0102293 A1* | 4/2013 | Martin et al. .............. 455/414.1 |

FOREIGN PATENT DOCUMENTS

WO 2007001646 A2 1/2007

OTHER PUBLICATIONS

International Search Report and Written Opinion for counterpart International Patent Application No. PCT/US2013/048298 mailed Nov. 8, 2013.

* cited by examiner

*Primary Examiner* — Huy D Vu
*Assistant Examiner* — Teisha D Hall
(74) *Attorney, Agent, or Firm* — Brian M. Mancini

(57) ABSTRACT

Providing a private connection for a mobile device in a wireless local area network includes a mobile device operable to associate to a home wireless local area network (WLAN), request a temporary digital extension from the WLAN, receive an assigned temporary digital extension from the WLAN, register with the WLAN using the temporary digital extension, and initiate a call from the temporary digital extension to a target extension. In addition, an in-store server is operable to register the temporary digital extension, recognize the temporary digital extension in the initiated call, establish the call to the target extension, and route the call between the temporary digital extension and the target extension.

17 Claims, 3 Drawing Sheets

PRIVATE LINE AUTOMATIC RINGDOWN-LIKE CONNECTION FOR A MOBILE DEVICE

FIELD OF THE DISCLOSURE

The present disclosure relates generally to communication systems and more particularly to a Private Line Automatic Ringdown-like connection for a mobile device.

BACKGROUND

There are many occasions where a customer may need assistance in a retail establishment. Traditionally, courtesy phones could be placed at different locations throughout the establishment. A customer picking up one of these courtesy phones would automatically be connected to a phone at a service or information desk, for example, without the need for dialing (i.e. automatic ringdown). These analog wireline systems are typically owned and controlled by the retail establishment, without any connection through an external public switched telephone network (i.e. a private line).

However, there is a problem in that it may take some time for the customer to locate one of these private line automatic ringdown (PLAR) courtesy phones, if the establishment even provides them. Alternatively, a customer could use their own cellular phone to call the main phone number for the establishment. However, this requires the customer to first look up and then dial the correct number, which may or may not connect directly to the proper assistance, and possibly suffer through phone transfers or holds, all of which are inconvenient.

Accordingly, there is a need for a convenient system within a retail establishment to connect a customer with the proper assistance.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
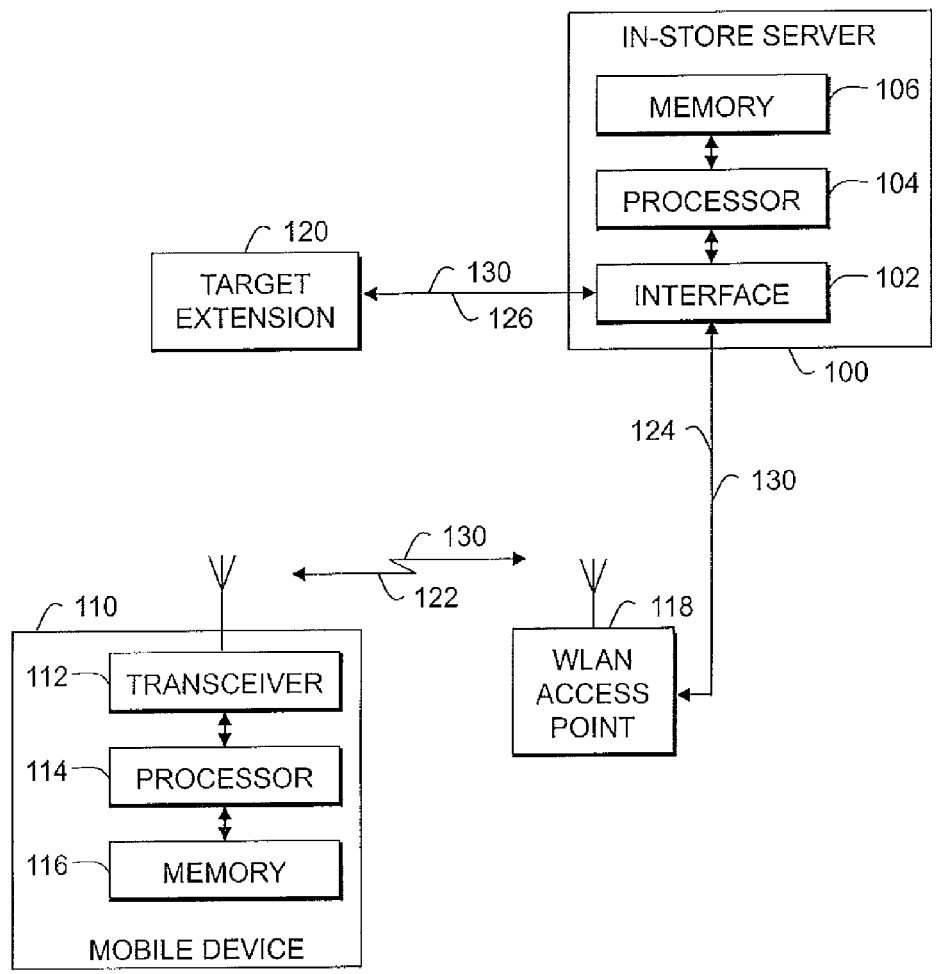
FIG. 1 is a simplified block diagram of a system in accordance with an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present invention provides a convenient system within a retail establishment to connect a customer with the proper assistance. In particular, the present invention accomplishes this by providing to wireless customers digital telephony features that were traditionally available through analog-based Private Line Automatic Ringdown (PLAR) telephony systems. Specifically, more and more retailers are presenting their customers with customized mobile "loyalty" applications that run on smart-phones (for e.g. iPhones™, Android™ based devices, etc. In addition, retailers are switching their retail stores to IP-based telephony. These two factors can be used to enhance the customer experience, as will be detailed herein in accordance with the present invention, by assignment of a PLAR-like temporary digital extension to an application running on a mobile device, such as a smart-phone with local area network IEEE 802.11 (Wi-Fi) capability in a retail establishment without having a need for a dedicated analog PLAR system. The embodiments described herein automatically route a communication from a mobile device to a target extension in the store, in response to a call for assistance from a customer.

FIG. 1 depicts an example system and wireless local area network (WLAN) environment utilizing the present invention. A typical WLAN is operable within a limited environment, such as within a store for example. An in-store server 100 is utilized to help coordinate the many tasks that are part of a store's network operations. The in-store server is connected to at least one access port or access point 118 that provides wireless communication services to any mobile devices 110 within the environment using a standardized air interface 122.

The in-store server may include an Ethernet interface 102 to communicate on the local area network, such as with local access points 118, private network communication devices (e.g. 120), or to an external Internet connection (not shown). In the example shown, an Ethernet connection 124 can be provided to the access point 118, and connection 126 can be provided to a private network communication device, wherein the connection 126 can be a private switch telephone network or another Ethernet connection providing Voice-over-IP digital telephony, for example. Also, the wireless communication air interface can be compliant to IEEE 802.11 (Wi-Fi) and variants thereof; IEEE 802.16 (WiMAX or any other variation); Universal Mobile Telecommunications System (UMTS); Code Division Multiple Access (CDMA) including all variants; Global System for Mobile Communications (GSM) and all variants; Time Division Multiple Access (TDMA) and all variants; Direct Sequence Spread Spectrum; Frequency Hopping Spread Spectrum; wireless/cordless telecommunication protocols; wireless home network communication protocols; paging network protocols; satellite data communication protocols; wireless hospital or health care facility network protocols such as those operating in the WMTS bands; GPRS; and proprietary wireless data communication protocols such as variants of Wireless USB. It is envisioned that the present invention is operable without the use of a public switched telephone network, a cellular network, or other wide area network.

The in-store server 100 also includes a processor 104 coupled to the interface 102. The processor is also coupled to a storage device or memory 106. A mobile device 110 is operable using the network protocols over the WLAN air interface 122. The mobile device includes a processor 114 coupled to a transceiver 112 and a storage device or memory 116. The memories can comprise any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory can incorporate electronic, magnetic, optical, and/or other types of storage media. Note that the memory can have a distributed architecture, where various components are situated remotely from one another, but can be accessed by the device or server.

Various other entities are adapted to support the inventive concepts of the embodiments of the present invention. Those skilled in the art will recognize that the drawings herein do not depict all of the equipment necessary for system to operate but only those system components and logical entities particularly relevant to the description of embodiments herein. For example, routers, controllers, switches, access points/ports, and wireless clients can all includes separate communication interfaces, transceivers, memories, and the like, all under control of a processor. In general, components such as processors, transceivers, memories, and interfaces are well-known. For example, processing units are known to comprise basic components such as, but not limited to, microprocessors, microcontrollers, memory cache, application-specific integrated circuits, and/or logic circuitry. Such components are typically adapted to implement algorithms and/or protocols that have been expressed using high-level design languages or descriptions, expressed using computer instructions, expressed using messaging logic flow diagrams.

Thus, given an algorithm, a logic flow, a messaging/signaling flow, and/or a protocol specification, those skilled in the art are aware of the many design and development techniques available to implement one or more processors that perform the given logic. Therefore, the entities shown represent a system that has been adapted, in accordance with the description herein, to implement various embodiments of the present invention. Furthermore, those skilled in the art will recognize that aspects of the present invention may be implemented in and across various physical components and none are necessarily limited to single platform implementations. For example, the memory and control aspects of the present invention may be implemented in any of the devices listed above or distributed across such components.

Figure 2:
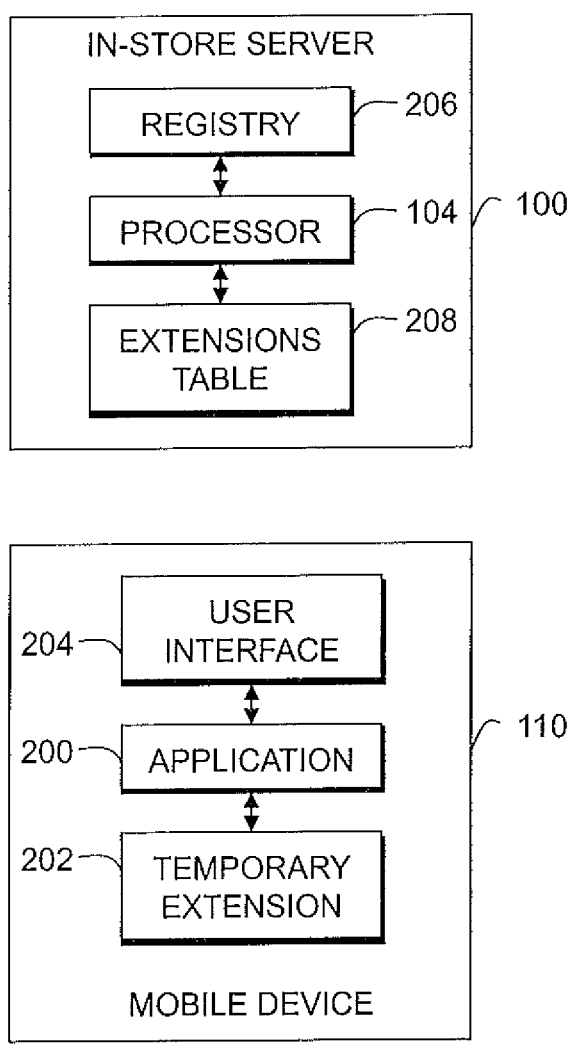
FIG. 2 is a simplified block diagram of components of FIG. 1.

Referring to FIGS. 1 and 2, the present invention provides a customized mobile application written and distributed by the owner of the retail establishment to a customer's mobile device. This application 200 could have been downloaded by a user to their mobile device 110 previously and stored in memory 116. Alternatively, users can download the application to their device while in the retail establishment by scanning a barcode in the store or by other means. The application can be launched (i.e. run on the device processor 114) by manual activation by the user, or by the application running in the background and launching when it recognizes that the mobile device 110 is located near a retail establishment associated with the application.

Upon entering the store or manual launching by the customer, the application can direct the mobile device 110 to associate to a home wireless local area network (WLAN) controlled by the store, and particularly to an access point 118 of the WLAN connected to a network server 100. This associating can be done manually by the customer, such as by entering the require login information or by scanning a store barcode, for example. Alternatively, associating can be performed automatically, such as by launching the downloaded mobile application which is configured to automatically associate with any local area networks controlled by the store. Association requires the mobile device to configure itself to use standard WLAN protocols over the air interface 122. The mobile device could be virtually any IEEE 802.11 device that can download mobile applications and that has a display screen, keyboard, or user interface 204 to allow simple user interaction.

In accordance with the present invention, the user's mobile device 110 include a defined help button or function on a keyboard or display screen 204. Activation of the button or function will request assistance so that a customer can get interactive help when they need assistance. The help button or function can be provided by the mobile application 200 running on the processor 114 of the mobile device. When a customer discovers that he or she needs assistance, the customer can activate the help button/function provided on their user interface 204 by the mobile application on their mobile device to send a request for assistance. In particular, activation of the button/function will send a request (such as through an http request) for a temporary IP-based PLAR-like digital extension, for the mobile device to use, to the in-store server 100 via the air interface 122 to the access point 118 and on to the server 100 via the Ethernet connection 124 from the access point 118 to the server interface 102.

The in-store server includes an extensions table 208 in its memory 106 that includes a pool of temporary extensions, such as Session Initiation Protocol (SIP) extensions, that the mobile device can use along with an associated target extension to be used to provide assistance for calls from one of the temporary extensions. The target extension can be chosen by its previous usage or other selection parameter. The in-store server then assigns a temporary digital extension (such as extension #1234) to the mobile application from the pool of temporary extensions. It should be noted that the system can be configured with multiple pools of temporary extensions, each pool being assigned to a different target extension in case multiple PLAR-like target extensions are needed by different customers. The in-store server can optionally authenticate the mobile application (for example through TLS) before assigning the temporary digital extension.

The in-store server sends the assigned the temporary digital extension (e.g. 1234), to be received by the mobile application, via the Ethernet connection 124, access point 118, and air interface 122 to the mobile device transceiver 112 and processor 114 running the application. The mobile device application 200 can then store this temporary digital extension 202 in the memory 116. Optionally, the in-store server could automatically register the temporary digital extension for the mobile application in its registry 206 of its memory 106 and send an acknowledgement of a successful registration.

The mobile application, upon receiving the temporary digital extension (e.g. 1234), will register with the in-store server of the WLAN (if the server has not already done so) using the temporary digital extension in standard IP-based telephony based protocol. For example, the protocol used is Session Initiation Protocol (SIP). The in-store server, running SIP to provide telephony services, registers the mobile application's temporary PLAR-like digital extension (e.g. 1234) in its registry 206 of its memory 106 for a configurable period of time (e.g. five minutes or an average usage time). After expiry of the time, the temporary digital extension is returned to the pool, and if the customer needs assistance after this time, the mobile application must re-register for a new temporary digital extension. Alternatively, before the expiry of the time, the mobile application can re-register with the server to maintain the same temporary digital extension. In yet another embodiment, the temporary digital extension is assigned to the customer for the full amount of time that the customer is location within the store, and only when the customer leaves the store (determined by de-association from the WLAN or GPS locationing) will the temporary digital extension be returned to the pool.

The in-store server can then send an acknowledgement of a successful registration (if it has not already done so) to the application. The in-store SIP server is also configured with a fixed target digital extension that is assigned to the pool of temporary PLAR-like digital extensions, wherein a call from a device using the temporary extension is automatically routed to the target extension to provide the needed assistance. This target extension (for example 5678) is also returned to the mobile application as part of successful registration acknowledgement message.

The mobile application 200 will present to the customer means to automatically initiate a call 130 from the temporary digital extension to the target extension returned in the successful registration acknowledgement message. For example, such means can be a user interface 204 with a pre-defined button of function that is configured or displayed on the mobile device by the mobile application that, when pressed will initiate a call 130 the target extension using IP-based telephony based protocol.

The in-store server will recognize 318 the target extension in the call using IP-based telephony based protocol and establish the call leg to the target extension 120 (e.g. 5678) such that an operator can then answer the call on this target extension. Optionally, if the call cannot be established between the processor 104 and the target extension 120, the processor can search its extensions table 208 for another target extension to associate with the given temporary extension, and can go down its list of target extensions until a connection can be established with any one of the target extensions. In another option, if the call cannot be established between the processor 104 and the target extension 120, the processor can present a busy tone to the mobile device or can disconnect after a predefined timeout. Upon the establishment of the final call leg, the in-store server can route the call 130 between temporary digital extension (e.g. 1234) and target extension (e.g. 5678).

The mobile application 200 will automatically de-register the temporary extension (e.g. 1234) after the registration period expires (in this example, five minutes), after which the in-store server will then relocate this extension back to the available pool in its extensions table 208 so that it can be assigned to another customer. If the customer needs assistance after this time, the mobile application must re-register for a new temporary digital extension. Alternatively, before the expiry of the time, the mobile application can re-register with the server to maintain the same temporary digital extension. In yet another embodiment, the temporary digital extension is de-registered and returned to the pool when the customer leaves the store (determined by de-association from the WLAN or GPS locationing).

Figure 3:
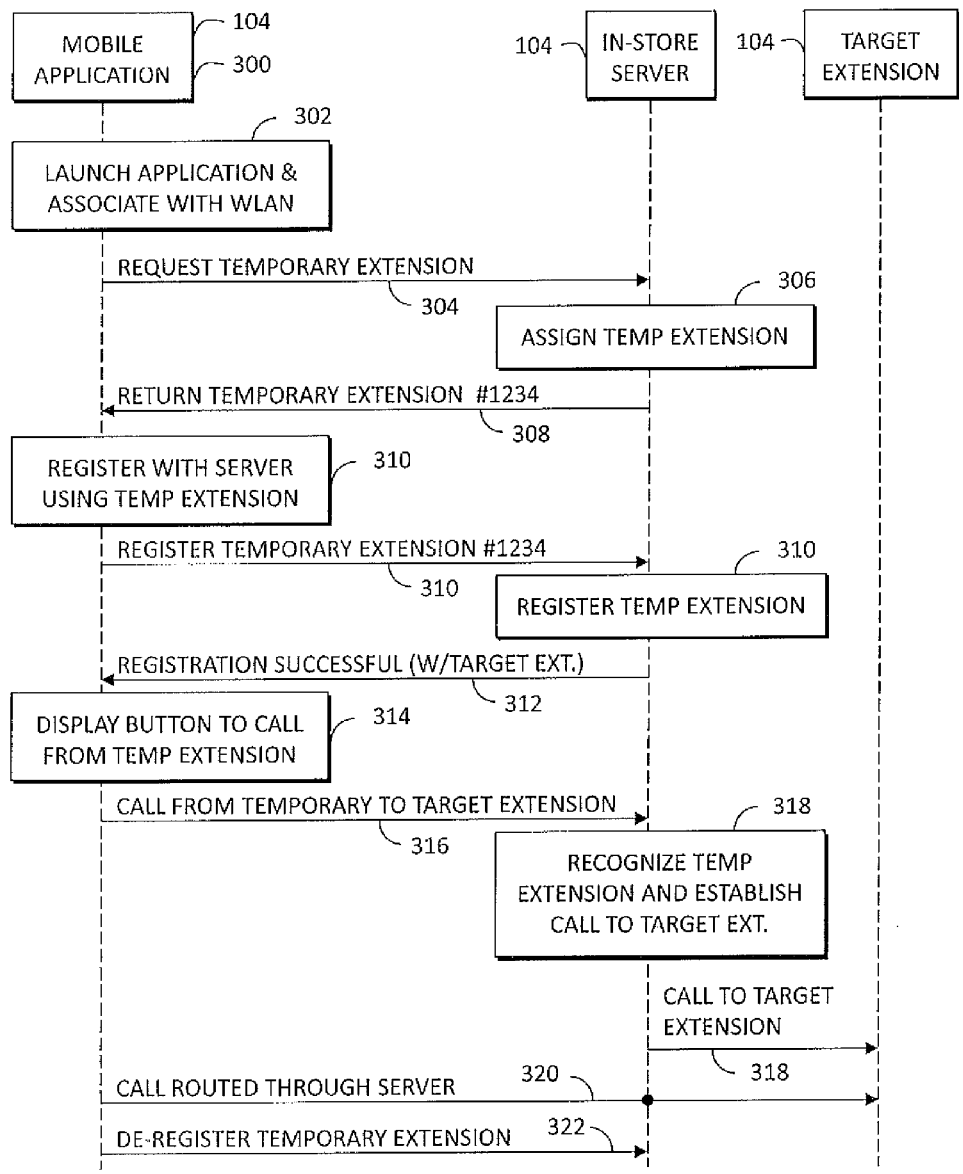
FIG. 3 is a simplified flow diagram of a method in accordance with an embodiment of the present invention.

As shown in FIG. 3, the present invention also includes a method for providing Private Line Automatic Ringdown-like connection for a mobile device in a wireless local area network. The method includes a first step 300 of providing a customized mobile application written and distributed by the owner of the retail establishment to a customer's mobile device. This application could have been downloaded by a user to their mobile device previously. Alternatively, users can download the application to their device while in the retail establishment by scanning a barcode or other means.

A next step 302 includes associating the mobile device, as a customer enters a store, to a home wireless local area network (WLAN) controlled by the store, and particularly to an access point of the WLAN connected to a network server. This associating can be done manually by the customer. Alternatively, associating can be performed automatically, such as by launching the downloaded mobile application which is configured to automatically associate with any local area networks controlled by the store.

A next step 304 includes the mobile application requesting (such as through an http request) the in-store server for a temporary IP-based PLAR-like digital extension that it can use.

A next step 306 includes the in-store server assigning a temporary digital extension (such as extension #1234) to the mobile application from a pool of temporary extensions, such as Transport Layer Security (TLS) extensions. It should be noted that the system can be configured with multiple pools of temporary extensions, each pool being assigned to a different target extension in case multiple PLAR-like target extensions are needed. The in-store server can optionally authenticate the mobile application (for e.g. through TLS) before assigning the temporary digital extension.

A next step 308 includes the in-store server sending the assigned the temporary digital extension (e.g. 1234) to be received by the mobile application. Optionally, the in-store server can automatically register the temporary digital extension for the mobile application and send an acknowledgement of a successful registration.

In a next step 310, the mobile application, upon getting the temporary digital extension (e.g. 1234), will register with the in-store server of the WLAN (if the server has not already done so) using the temporary digital extension in standard IP-based telephony based protocol. For example, the protocol used is Session Initiation Protocol (SIP). The in-store server, running SIP to provide telephony services, registers the mobile application's temporary PLAR-like digital extension (e.g. 1234) for a configurable period of time (e.g. five minutes or an average usage time). After expiry of the time, the temporary digital extension is returned to the pool, and if the customer needs assistance after this time, the mobile application must re-register for a new temporary digital extension. Alternatively, before the expiry of the time, the mobile application can re-register with the server to maintain the same temporary digital extension. In yet another embodiment, the temporary digital extension is assigned to the customer for the full amount of time that the customer is location within the store, and only when the customer leaves the store (determined by de-association from the WLAN or GPS locationing) will the temporary digital extension be returned to the pool.

A next step 312 includes the in-store server sending an acknowledgement of a successful registration (if it has not already done so). The in-store SIP server is also configured with a fixed target digital extension that is assigned to the pool of temporary PLAR-like digital extensions, wherein a call from a device using the temporary extension is automatically routed to the target extension to provide the needed assistance. This target extension (for e.g. 5678) is also returned to the mobile application as part of successful registration acknowledgement message.

In a next step 314, upon getting registered, mobile application will present to the customer means to automatically initiate a call 316 from the temporary digital extension to the target extension returned in the successful registration acknowledgement message. For example, such means can be a user interface with a pre-defined button that is configured or displayed on the mobile device by the mobile application that, when pressed will automatically call 316 the target extension using IP-based telephony based protocol. In-store server will recognize 318 the target extension in the call using IP-based telephony based protocol and establish the last call leg between it and the target extension (e.g. 5678) such that an operator can then answer the call on this target extension.

Upon the establishment of the last call leg the in-store server can route 320 the call between temporary digital extension (e.g. 1234) and target extension (e.g. 5678) on the in-store private line.

The mobile application will automatically de-register 322 the temporary extension (e.g. 1234) after the registration period expires (in this example, five minutes). In-store server will then relocate this extension back to the available pool so that it can be assigned to another customer. If the customer needs assistance after this time, the mobile application must re-register for a new temporary digital extension. Alternatively, before the expiry of the time, the mobile application can re-register with the server to maintain the same temporary digital extension. In yet another embodiment, the temporary digital extension is de-registered and returned to the pool when the customer leaves the store (determined by de-association from the WLAN or GPS locationing).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for providing a private connection for a mobile device in a wireless local area network, the method comprising the steps of:

associating the mobile device to a home wireless local area network (WLAN);

requesting a temporary digital extension from an in-store server of the WLAN, wherein the temporary digital extension is stored within a pool of temporary extensions in an extensions table in the in-store server;

receiving an assigned temporary digital extension from the WLAN;

registering with the WLAN using the temporary digital extension;

initiating a call from the temporary digital extension to a target extension provided to the mobile device;

recognizing the temporary digital extension and establishing a call leg to the target extension; and routing the call between the temporary digital extension and the target extension.

2. The method of claim 1, further comprising the step of sending an acknowledgement of a successful registration that includes the target extension to the mobile device.

3. The method of claim 1, wherein the temporary digital extension is IP-based, and a call to the target extension uses IP-based telephony based protocol.

4. The method of claim 1, further comprising the step of deregistering the temporary extension after expiry of a predefined registration period, whereupon the server will then relocate this temporary extension back to the available pool in its extensions table for assignment to another customer.

5. The method of claim 1, wherein the requesting step includes selecting a temporary extension from the pool of temporary extensions, where each temporary extension is associated with the target extension to be provided to the mobile device.

6. The method of claim 1, wherein the requesting step includes multiple pools of temporary extensions where needed by different customers, each pool being assigned to a different target extension.

7. The method of claim 1, wherein requesting includes one fixed target extension assigned to the pool of temporary digital extensions, where a call from the mobile device having any temporary digital extension from the pool will be automatically routed to the one fixed target extension.

8. A system for providing a private connection for a mobile device in a wireless local area network, the method comprising the steps of:
   a mobile device operable to associate to a home wireless local area network (WLAN), request a temporary digital extension from an in-store server of the WLAN, wherein the temporary digital extension is stored within a pool of temporary extensions in an extensions table in the server, receive an assigned temporary digital extension from the WLAN, register with the WLAN using the temporary digital extension, and initiate a call from the temporary digital extension to a target extension provided to the mobile device; and
   and in-store server operable to register the temporary digital extension, recognize the temporary digital extension in the initiated call, establish the call to the target extension, and route the call between the temporary digital extension and the target extension.

9. The system of claim 8, further comprising the in-store server is further operable to send an acknowledgement of a successful registration that includes the target extension to the mobile device.

10. The system of claim 8, wherein the temporary digital extension is IP-based, and a call to the target extension uses IP-based telephony based protocol.

11. The system of claim 8, further comprising the mobile device deregistering the temporary extension after expiry of a predefined registration period, whereupon the server will then relocate this temporary extension back to the available pool in its extensions table for assignment to another customer.

12. The system of claim 8, wherein the in-store server is further operable to select a temporary extension from the pool of temporary extensions, where each temporary extension is associated with the target extension to be provided to the mobile device.

13. The system of claim 8, wherein the server includes multiple pools of temporary extensions where needed by different customers, each pool being assigned to a different target extension.

14. The system of claim 8, wherein the in-store server has one fixed target extension assigned to the pool of temporary digital extensions, where a call from the mobile device having any temporary digital extension from the pool will be automatically routed to the one fixed target extension.

15. The system of claim 8, wherein if the call cannot be established to the target extension, the server can search its extensions table for another target extension to associate with the given temporary extension, and can go down its list of target extensions until a connection can be established with any one of the target extensions.

16. The system of claim 8, wherein the in-store server establishes a registration period time for the mobile device, wherein the mobile device can re-register with the server to maintain the same temporary digital extension before the expiry of the registration period time.

17. The system of claim 8, wherein the temporary digital extension is de-registered and returned to the pool when the mobile device de-associates from the WLAN.

* * * * *